United States Patent
Ogino

(10) Patent No.: US 9,983,468 B2
(45) Date of Patent: May 29, 2018

(54) LIGHT SOURCE UNIT AND PROJECTOR

(71) Applicant: CASIO COMPUTER CO., LTD., Tokyo (JP)

(72) Inventor: Hiroshi Ogino, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/189,166

(22) Filed: Jun. 22, 2016

(65) Prior Publication Data

US 2017/0059977 A1 Mar. 2, 2017

(30) Foreign Application Priority Data

Aug. 26, 2015 (JP) .................................. 2015-166490
Apr. 19, 2016 (JP) .................................. 2016-083281

(51) Int. Cl.
G03B 21/20 (2006.01)
H04N 9/31 (2006.01)
G03B 33/04 (2006.01)

(52) U.S. Cl.
CPC ..... G03B 21/2013 (2013.01); G03B 21/2033 (2013.01); G03B 33/04 (2013.01); G03B 21/204 (2013.01); H04N 9/3164 (2013.01)

(58) Field of Classification Search
CPC ............ G03B 21/2013; G03B 21/204; G03B 21/2033; H04N 9/315; H04N 9/3164
USPC .................... 353/94; 362/227, 228
See application file for complete search history.

(56) References Cited

U.S. PATENT DOCUMENTS 8,029,139 B2 * 10/2011 Ellinger ............. G02B 27/2207
353/10
2004/0218387 A1 * 11/2004 Gerlach .................... F21K 9/00
362/231

FOREIGN PATENT DOCUMENTS

| CN | 1950747 A | 4/2007 |
| CN | 101339356 A | 1/2009 |
| JP | 2015-045825 A | 3/2015 |

OTHER PUBLICATIONS

First Office Action dated Dec. 15, 2017 received in Chinese Patent Application No. CN 201610651977.9 together with an English language translation.

* cited by examiner

Primary Examiner — Ryan Howard
(74) Attorney, Agent, or Firm — Scully, Scott, Murphy & Presser, P.C.

(57) ABSTRACT

To provide a light source unit which can be formed compact in size while contributing to enhancement in luminance and a projector including this light source unit, there is provided a light source unit including a first light source which emits light in a range of first wavelengths, and a second light source which emits light in a range of second wavelengths which is different from the range of first wavelengths, wherein the first light source and the second light source each include a long wavelength light emitting portion and a short wavelength light emitting portion, the long wavelength light emitting portion emitting, of lights of different wavelengths which exist in a range of light wavelengths producing light of similar colors, light of a long wavelength, the short wavelength light emitting portion emitting light of a short wavelength.

14 Claims, 10 Drawing Sheets

LIGHT SOURCE UNIT AND PROJECTOR

CROSS-REFERENCE TO RELATED APPLICATION

This application is based upon and claims the benefit of priority under 35 USC 119 from Japanese Patent Application No. 2015-166490 filed on Aug. 26, 2015 and Japanese Patent Application No. 2016-083281 filed on Apr. 19, 2016, the entire disclosures of which, including the descriptions, claims, drawings and abstracts, are incorporated herein by reference.

BACKGROUND OF THE INVENTION

Field of the Invention

The present invention relates to a light source unit and a projector including this light source unit.

Description of the Related Art

In these days, data projectors are used on many occasions as an image projection system which projects a screen and a video image of a personal computer, as well as images based on image data which is stored on a memory card on to a screen. In these projectors, light emitted from a light source is collected to a micromirror display device made up of DMDs (Digital Micromirror Devices) or a liquid crystal panel to thereby project a color image on to a screen.

A projector disclosed in Japanese Unexamined Patent Application No. 2015-45825 (JP-A-2015-45825) includes an excitation light source on which a plurality of blue laser diodes are arranged into a matrix. Excitation light from this excitation light source is shone on to a luminescent wheel of a luminous light emitting device, whereby light in a range of green wavelengths is emitted from the luminescent wheel. This projector also includes a blue light source device which includes a blue light emitting diode to emit light in a range of blue wavelengths and a red light source device which includes a red light emitting diode to emit light in a range of red wavelengths. The light in the green wavelength range, the light in the blue wavelength range and the light in the red wavelength range are shone on to a display device making up DMDs via a light source-side optical system, from which image light is projected on to a screen via a projection side optical system as projected light.

Light emitted from the blue light source device and the red light source device of the projector disclosed in JP-A-2015-45825 is light of a single wavelength. Because of this, the numbers of blue LED chips and red LED chips need to be increased in order to enhance the luminance of blue and red light. This causes a problem that in order to enhance the luminance of light emitted from the light source of each color, the number of LED chips of the light source concerned needs to be increased accordingly.

SUMMARY OF THE INVENTION

The invention has been made in view of the situations described above, and an object of the invention is to provide a light source unit which can be formed small in size while contributing to enhancement in the luminance of light emitted therefrom and a projector which employs the light source unit.

According to a first aspect of the invention, there is provided a light source unit including:

a first light source which emits light in a first wavelength range; and a second light source which emits light in a second wavelength range which is different from the first wavelength range, wherein the first light source and the second light source each include a long wavelength light emitting portion and a short wavelength light emitting portion, the long wavelength light emitting portion emitting, of lights of different wavelengths which exist in a range of light wavelengths producing light of similar colors, light of a long wavelength, the short wavelength light emitting portion emitting light of a short wavelength.

According to a second aspect of the invention, there is provided a projector including:

the light source unit according to the first aspect;

a display device on to which light source light from the light source unit is shone to form image light;

a projection-side optical system configured to project the image light emitted from the display device on to a screen; and a projector controller configured to control the light source unit and the display device.

DETAILED DESCRIPTION OF THE PREFERRED EMBODIMENT

First Embodiment

Figure 1:
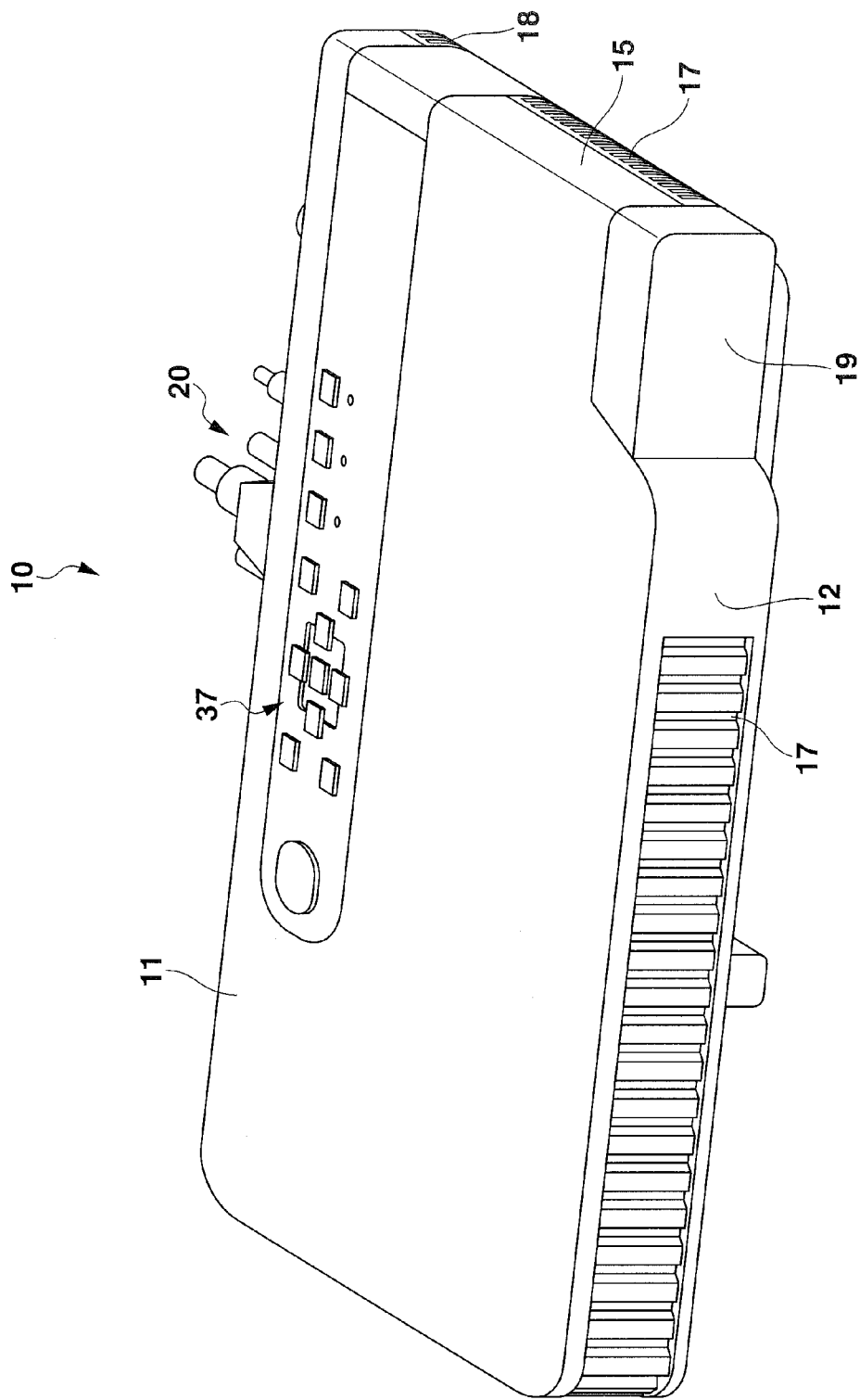
FIG. 1 is an external perspective view showing a projector according to a first embodiment of the invention.

Hereinafter, a first embodiment of the invention will be described. FIG. 1 is an external perspective view of a projector 10 which represents a projector according to a first embodiment of the invention. In this embodiment, when referred to in relation to the direction of the projector 10, left and right denote, respectively, left and right in relation to the projecting direction of the projector 10, and when referred to in relation to the direction of the projector 10, front and rear denote, respectively, front and rear in relation to the direction of a screen and a traveling direction of a pencil of light that is emitted from the projector 10 towards a screen.

As shown in FIG. 1, the projector 10 has a substantially rectangular parallelepiped housing. The projector 10 has a lens cover 19 that covers a projection port provided at a side of a front panel 12 that is a front side panel of the housing of the projector 10. A plurality of inside air outlet slit holes 17 are provided in the front panel 12. Additionally, although not shown, the projector 10 includes an IR reception unit which receives a control signal from a remote controller.

In addition, a keys/indicators unit 37 is provided on an upper panel 11 of the housing. Disposed on this keys/indicators unit 37 are keys and indicators that include a power indicator, a projection switch key, and an overheat indicator. The power indicator informs whether a power supply switch key or a power supply is on or off. The projection switch key switches on or off the projection by the projector 10. The overheat indicator informs of an overheat condition occurring in a light source unit, a display device, or a control circuit when they really overheat.

Further, provided on a back panel 13 of the housing are an input/output connector unit where USB terminals, a video signal input D-SUB terminal into which analog RGB video signals are inputted, an S terminal, and an RCA terminal are provided and (a group of) various types of terminals 20 including a power supply adaptor. Additionally, a plurality of outside air inlet slit holes are formed in the back panel of the housing. Additionally, pluralities of inside air outlet slit holes 17 are formed in a right side panel, not shown, that is a side panel of the housing, a left side panel 15 that is a side panel shown in FIG. 1 and the front panel 12. Further, a plurality outside air inlet slit holes 18 are also formed near a corner portion defined between the left side panel 15 and the back panel 13.

Next, a projector controller of the projector 10 will be described by the use of a functional block diagram shown in FIG. 2. The projector controller includes a control module 38, an input/output interface 22, an image transforming module 23, a display encoder 24 and a display driver 26.

The control module 38 controls respective operations of circuitries within the projector 10 and is made up of a CPU, a ROM which stores in a fixed fashion operation programs of various types of settings and a RAM which is used as a working memory.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector controller. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control device and drives a display device 51, which is a spatial optical modulator (SOM), at an appropriate frame rate according to the image signal outputted from the display encoder 24. In this projector 10, a pencil of light that is emitted from a light source unit 60 is shone onto the display device 51 via a light source-side optical system, whereby an optical image is formed by using reflected light that is reflected by the display device 51. The image so formed is then projected on to a screen, not shown, via a projection-side optical system. In addition, a movable lens group 235 of the projection-side optical system is driven by a lens motor 45 for zooming or focusing.

An image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium.

Further, when in a reproducing mode, the image compression/expansion module 31 performs the following operation. Specifically, the image compression/expansion module 31 reads out image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images based on the image data stored on the memory card 32.

Operation signals which are generated at the keys/indicators unit 37 which includes the main keys and indicators which are provided on the upper panel 11 of the housing of the projector 10 are sent out directly to the control module 38. Key operated signals from the remote controller are received by the IR reception unit 35, and a code signal demodulated at an IR processing module 36 is outputted to the control module 38.

In addition, an audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 so as to output loudly sound or voice based on the audio data.

The control module 38 controls a light source control circuit 41 which is configured as a light source controller. This light source control circuit 41 controls individually the operations of an excitation light shining device, a red light source device and a blue light source so as to emit light in ranges of green, red and blue wavelengths, respectively, at predetermined timings so that specified ranges of wavelengths of light that are required in producing an image are emitted from the light source unit 60.

Further, the control module 38 causes a cooling fan drive control circuit 43 to detect temperatures through a plurality of temperature sensors which are provided in the light source unit 60 so as to control the rotating speeds of cooling fans based on the results of the temperature detections. Additionally, the control module 38 also causes the cooling fan drive control circuit 43 to keep the cooling fans rotating even after the power supply to a projector main body is switched off by use of a timer. Alternatively, the control module 38 causes the cooling fan drive control circuit 43 to cut off the power supply to the projector main body of the projector 10 depending upon the results of the temperature detections by the temperature sensors.

Figure 3:
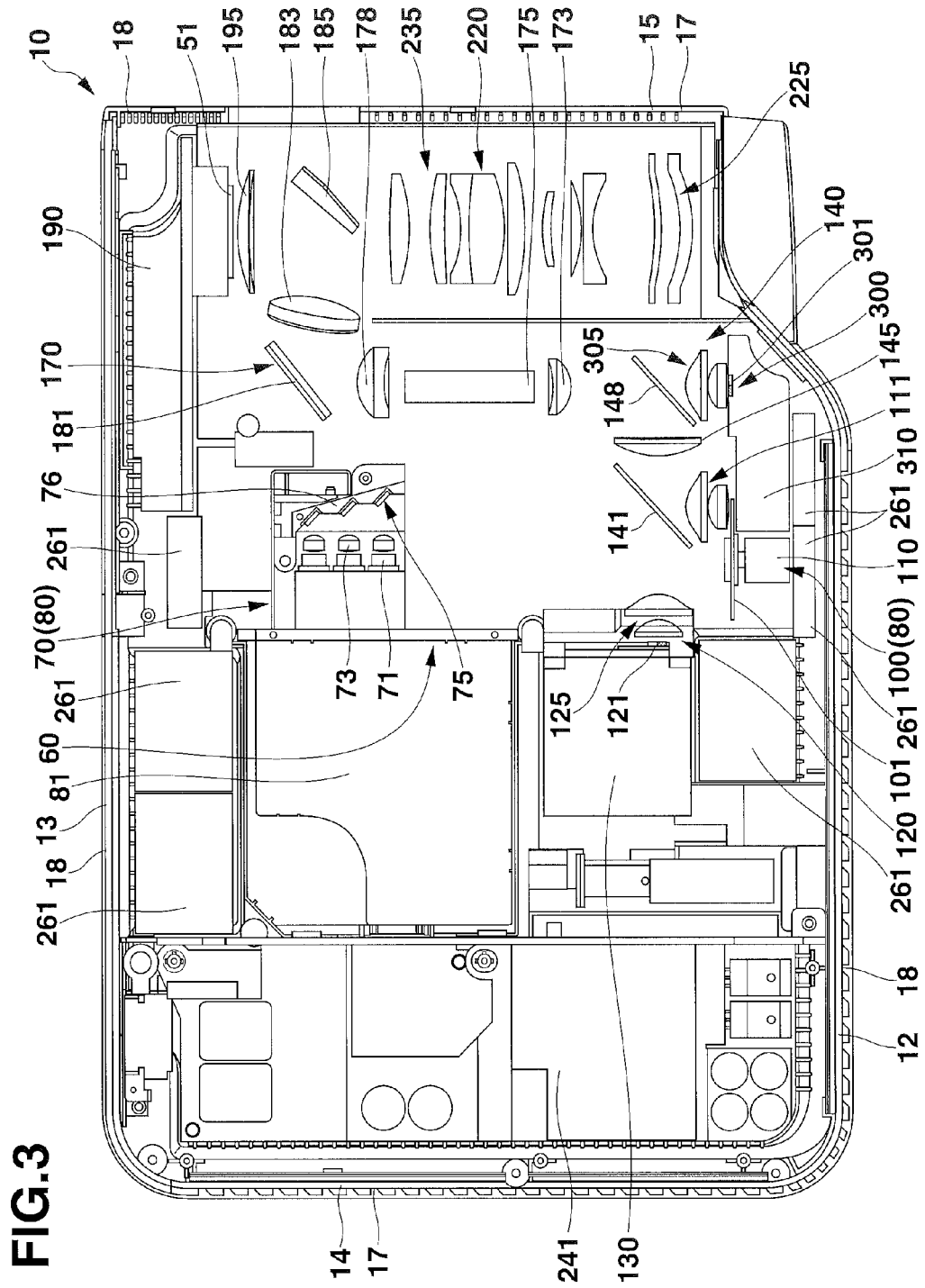
FIG. 3 is a schematic plan view showing an internal construction of the projector according to the first embodiment of the invention.

Next, an internal construction of the projector 10 will be described based on FIG. 3. FIG. 3 is a schematic plan view showing the internal construction of the projector 10. The projector 10 includes a control circuit board 241 which is provided near the right side panel 14. This control circuit board 241 includes a power supply circuit block and a light source control block. The projector 10 includes the light source unit 60 which is provided at a side of the control circuit board 241, that is, at a substantially central portion of the housing of the projector 10. Further, the projector 10 includes a light source-side optical system 170 and a projection-side optical system 220 which are disposed between the light source unit 60 and the left side panel 15.

The light source unit 60 includes a red light source device 120 which emits light in a range of red wavelengths, a green light source device 80 which emits light in a range of green wavelengths and a blue light source device 300 which emits light in a range of blue wavelengths. The green light source device 80 is made up of an excitation light shining device 70 and a luminescent plate device 100 which includes a luminescent wheel 101 as a luminescent plate. Then, the light source unit 60 also includes a light guiding optical system 140 configured to guide and emit light in the ranges of red, green and blue wavelengths. The light guiding optical system 140 collects light in the ranges of red, green and blue wavelengths emitted from the red, green and blue light source devices to an incident port of a light tunnel 175 via a collective lens 173.

The excitation light shining device 70, which acts as an excitation light source of the green light source device 80, is disposed at a substantially central portion in relation to a left-to-right direction of the housing of the projector 10 which lies near the back panel 13. The excitation light shining device 70 includes a light source group made up of a plurality of blue laser diodes 71 which are semiconductor light emitting elements which are disposed so that their optical axes are parallel to the back panel 13, a reflecting mirror group 75 which changes the direction of axes of light rays emitted from the blue laser diodes 71 through 90 degrees in the direction of the front panel 12, and a heat sink 81 which is provided between the blue laser diodes 71 and the right side panel 14.

The light source group is made up of the plurality of blue laser diodes 71 which are arranged into a matrix configuration, and in the case of this embodiment, a total of six laser diodes 71 are arranged into two rows and three columns. Collimator lenses 73 are disposed individually on the optical axes of the blue laser diodes 71, and these collimator lenses 73 transform light emitted individually from the blue laser diodes 71 into parallel light so as to enhance the directionality of the light so emitted. In the reflecting mirror group 75, a plurality of reflecting mirrors are arranged in a step-like fashion and are integrated with a mirror substrate 76. The reflecting mirrors are then adjusted in position so as to contract pencils of light emitted from the blue laser diodes 71 in one direction for emission.

A cooling fan 261 is disposed between the heat sink 81 and the back panel 13, and the blue laser diodes 71 are cooled by the cooling fan 261 and the heat sink 81. Further, a cooling fan 261 is also disposed between the reflecting mirror group 75 and the back panel 13, and the reflecting mirror group 75 is cooled by this cooling fan 261.

The luminescent wheel device 100 that makes up the green light source device 80 is disposed on an optical path of excitation light emitted from the excitation light shining device 70 and near the front panel 12. The luminescent wheel device 100 includes the luminescent wheel 101, a motor 110, and a collective lens group 111. The luminescent wheel 101 is disposed parallel to the front panel 12, that is, so as to be at right angles to an axis of light emitted from the excitation light shining device 70. The motor 110 drives the luminescent wheel 101 rotationally. The collective lens group 111 collects a pencil of excitation light emitted from the excitation light shining device 70 towards the luminescent wheel 101 and also collects a pencil of light emitted from the luminescent wheel 101 in the direction of the back panel 13. A cooling fan 261 is disposed between the motor 110 and the front panel 12, and the luminescent wheel device 100 is cooled by this cooling fan 261.

Here, in the luminescent wheel 101, which is the luminescent plate, a circular disc-shaped metallic base material is provided on a rotational shaft of the motor 110. The base material is mirror finished through silver deposition to form thereon a reflecting surface which reflects light. An annular recess portion is formed on the base material, and a luminous light emitting area is formed into an annular shape therein. This luminous light emitting area is made up of a layer of a mixture of a green luminescent material and a transparent resin binder.

Excitation light from the excitation light shining device 70 is shone on to the luminous light emitting area of the luminescent wheel 101. When the excitation light is shone on to the luminous light emitting area in this way, the green luminescent material in the green luminescent material layer on the luminous light emitting area is excited. Pencils of light produced in a luminescent fashion in the green luminescent material are emitted to all directions therefrom. The pencils of light so emitted travel directly towards the excitation light shining device 70 or are reflected on the reflecting surface of the luminescent wheel 101 to travel towards the excitation light shining device 70.

The excitation light shone on to the metallic base without being absorbed by the luminescent material in the luminescent material layer is reflected on the reflecting surface to be incident on the luminescent material layer to thereby excite the luminescent material. Consequently, by making a front surface of the recess portion on the luminescent wheel 101 into the reflecting surface, the utilization efficiency of excitation light emitted from the blue laser diodes 71 can be increased, thereby making it possible to produce brighter luminous light.

In the excitation light that is reflected on the reflecting surface of the luminescent wheel 101 towards the green luminescent material layer, the excitation light that is emitted towards the excitation light shining device 70 without being absorbed by the luminescent material passes through a first dichroic mirror 141 while luminous light is reflected by the first dichroic mirror 141. Thus, there is no risk of excitation light being emitted to the outside of the housing of the projector 10.

In FIG. 3, the red light source device 120 includes a red light source 121 and a collective lens group 125 which collects light emitted from the red light source 121. The red light source 121 is disposed so that an optical axis thereof becomes parallel to the blue laser diodes 71. Then, the red light source device 120 is disposed so that an optical axis thereof intersects light emitted from the excitation light shining device 70 and light in the range of green wavelengths which is emitted from the luminescent wheel 101. The red light source device 120 includes a heat sink 130 which is disposed on a side of the red light source 121 which faces the red panel 14. A cooling fan 261 is disposed between the heat sink 130 and the front panel 12, and the red light source 121 is cooled by this cooling fan 261. The red light source 121 is referred to as a first light source which is a light source of light in the range of red wavelengths or light in a first wavelength range. The red light source 121 will be described in detail later.

The blue light source device 300 includes a blue light source 301 and a collective lens group 305 which collects light emitted from the blue light source 301. The blue light source 301 is disposed so as to be parallel to an axis of light emitted from the luminescent plate device 100. The blue light source device 300 is disposed so that an optical axis thereof intersects light emitted from the red light source device 120. The blue light source device 300 includes a heat sink 310 which is disposed on a side of the blue light source 301 which faces the front panel 12. A cooling fan 261 is disposed between the heat sink 310 and the front panel 12, and the blue light source 301 is cooled by this cooling fan 261. The blue light source 301 is referred to as a second light source which is a light source of light in the range of blue wavelengths or light in a second wavelength range. The blue light source 301 will be described in detail later.

Then, the light guiding optical system 140 includes collective lenses that collect pencils of light in the ranges of red, green and blue wavelengths and dichroic mirrors that change the direction of axes of the pencils of light in the ranges of red, green and blue wavelengths so that the pencils of light are directed in the same direction. Specifically speaking, the first dichroic mirror 141 is disposed in a position where the axes of excitation light which is light in the range of blue wavelengths emitted from the excitation light shining device 70 and light in the range of green wavelengths emitted from the luminescent wheel 101 intersect the axis of light in the range of red wavelengths emitted from the red light source device 120. This first dichroic mirror 141 transmits excitation light which is light in the range of blue wavelengths and light in the range of red wavelengths and reflects light in the range of green wavelengths in such a way as to change the direction of the axis of the light in the range of green wavelengths through 90 degrees in the direction of the left panel 15.

A second dichroic mirror 148 is disposed in a position where the axis of light in the range of blue wavelengths emitted from the blue light source device 300 intersects the axis of light in the range of red wavelengths emitted from the red light source device 120. This second dichroic mirror 148 transmits the light in the range of blue wavelengths and reflects the light in the range of red wavelengths and the light in the range of green wavelengths so that the direction of the axes of the red and green lights is changed through 90 degrees in the direction of the back panel 13. Then, a collective lens 145 is disposed between the first dichroic mirror 141 and the second dichroic mirror 148.

Light in the ranges of red, green and blue wavelengths is caused to be incident on the collective lens 173 of the light source-side optical system 170 by the light guiding optical system 140 which is configured in the way described above. Namely, excitation light emitted from the excitation light shining device 70 passes through the first dichroic mirror 141 and is then shone on to the luminous light emitting area of the luminescent wheel 101 by way of the collective lens group 111. Then, light in the range of green wavelengths emitted from the luminescent plate device 100 is reflected by the first dichroic mirror 141 and is also reflected by the second dichroic mirror 148 by way of the collective lens 145 to thereby be incident on the collective lens 173.

Light in the range of red wavelengths emitted from the red light source device 120 passes through the first dichroic mirror 141 and is then reflected by the second dichroic mirror 148 by way of the collective lens 145 to thereby be incident on the collective lens 173. Light in the range of blue wavelengths emitted from the blue light source device 300 passes through the second dichroic mirror 148 to thereby be incident on the collective lens 173.

The light source-side optical system 170 is made up of the collective lens 173, the light tunnel 175, a collective lens 178, a light axis changing mirror 181, a collective lens 183, a light shining mirror 185 and a condenser lens 195. The condenser lens 195 emits image light emanating from the display device 51 that is disposed on a side of the condenser lens 195 that lies to face the back panel 13 towards a fixed lens group 225 and the movable lens group 235, and therefore, the condenser lens 195 is also regarded as part of the projection-side optical system 220.

The collective lens 173 is disposed near the light tunnel 175 to collect the light from the light source unit to the incident port of the light tunnel 175. The light in the ranges of red, green and blue wavelengths is collected by the collective lens 173 so as to be incident on the light tunnel 175. The pencil of light that has entered the light tunnel 175 is formed into a pencil of light whose intensity is distributed uniformly across the width thereof by the light tunnel 175.

The light axis changing mirror 181 is disposed on an optical axis of the light tunnel 175 on a side of the light tunnel 175 that lies to face the back panel 13 via the collective lens 178. A pencil of light emanating from an emanating port of the light tunnel 175 is collected by the collective lens 178, whereafter the direction of an axis of the pencil of light so collected is changed towards the left side panel 15 by the light axis changing mirror 181.

The pencil of light that is reflected by the light axis changing mirror 181 is collected by the collective lens 183 and is then shone on to the display device 51 at a specified angle via the condenser lens 195 by the light shining mirror 185. A heat sink 190 is provided on a side of the display device 51, made up of DMDs, which lies to face the back panel 13, and the display device 51 is cooled by this heat sink 190.

The pencil of light, which is the light emanating from the light source unit 60, is shone on to an image forming plane of the display device 51 by the light source-side optical system 170 and is then reflected on the image forming plane of the display device 51 to be projected on to a screen via the projection-side optical system 220 as projected light. Here, the projection-side optical system 220 includes the condenser lens 195, the movable lens group 235, and the fixed lens group 225. The movable lens group 235 can be moved by the lens motor. Then, the movable lens group 235 and the fixed lens group 225 are incorporated in a fixed lens barrel. Thus, the fixed lens barrel incorporating the movable lens group 235 therein is made into a variable focus lens which enables zooming and focusing adjustments.

By configuring the projector 10 in the way described heretofore, when light is emitted at different timings from the light sources of the respective colors, light in the range of red wavelength, light in the range of green wavelengths and light in the range of blue wavelengths are caused to be incident on the collective lens 173 and the light tunnel 175 sequentially via the light guiding optical system 140 and are then caused to be incident on the display device 51 via the light source-side optical system 170. Then, the DMDs making up the display device 51 of the projector 10 display light of red, green and blue colors in a time-sharing fashion according to inputted data, thereby making it possible for a color image to be projected on to the screen.

Figure 4A:
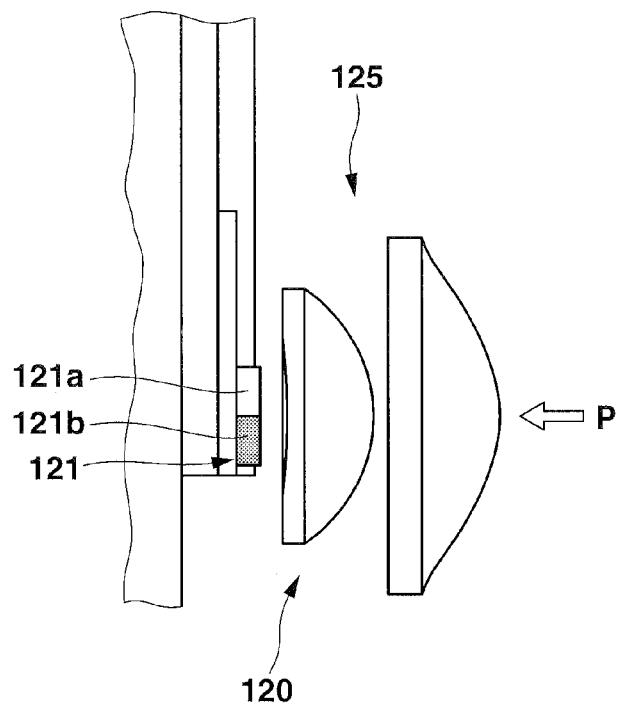
FIG. 4A is an enlarged schematic plan view of a red light source device of the projector according to the first embodiment of the invention.
Figure 4B:
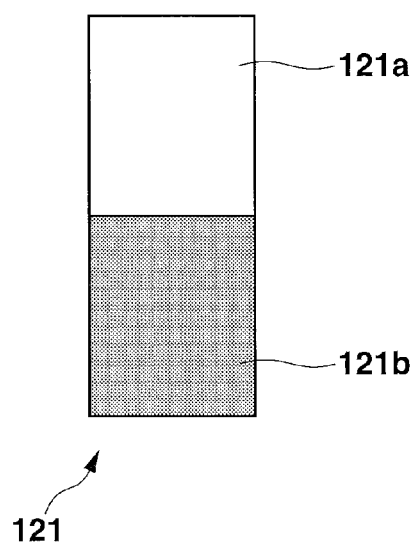
FIG. 4B is a schematic view of chips of a red light source of the projector according to the first embodiment of the invention as viewed from a light emitting side thereof.

Next, based on FIGS. 4A and 4B, the red light source 121 of the red light source device 120 will be described. FIG. 4A is a schematic plan view showing the red light source device 120 in an enlarged fashion. FIG. 4B is a schematic view showing the red light source 121 in a more enlarged fashion as viewed from a light emitting side P of the red light source 121.

In the red light source 121 shown in FIGS. 4A and 4B, when looking at the red light source 121 from the side thereof from which light is emitted, a red LED chip 121a is disposed on a left hand side and an amber LED chip 121b is disposed on a right hand side. The amber LED chip 121b has a better luminous efficiency than that of the red LED chip 121a. Red light of a wavelength of about 620 nm is emitted from the red LED chip 121a, and amber light of a wavelength of about 613 nm is emitted from the amber LED chip 121b. Thus, of the red light and the amber light which are lights of different wavelengths which exist in a range of light wavelengths producing light of similar colors in the range of red wavelengths (for example, 610 nm to 750 nm), red light or light of a long wavelength is emitted from the red LED chip 121a, and amber light or light of a short wavelength is emitted from the amber LED chip 121b, hence the red LED chip 121a is referred to as a long wavelength light emitting portion and the amber LED chip 121b is referred to as a short wavelength light emitting portion. In this way, the red light source device 121, which is a first light source, is formed as a multi-chip light source including the two types of light emitting diodes which are semiconductor light emitting elements.

Figure 5A:
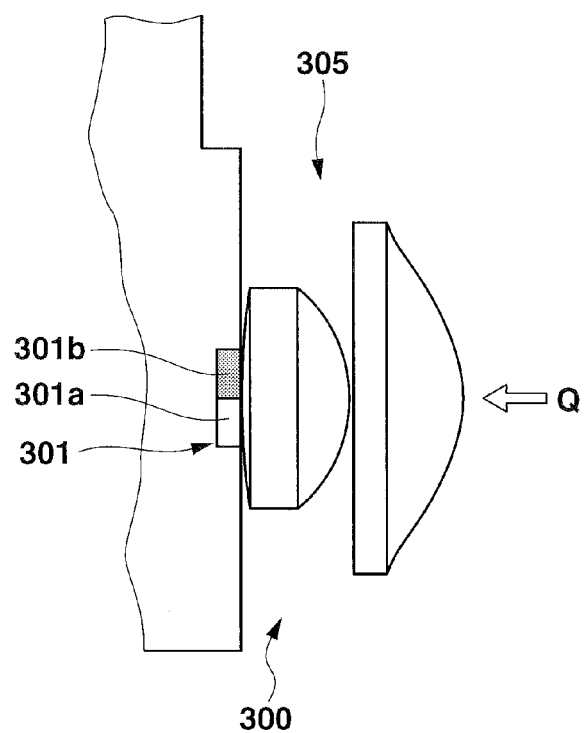
FIG. 5A is an enlarged schematic plan view of a blue light source device of the projector according to the first embodiment of the invention.
Figure 5B:
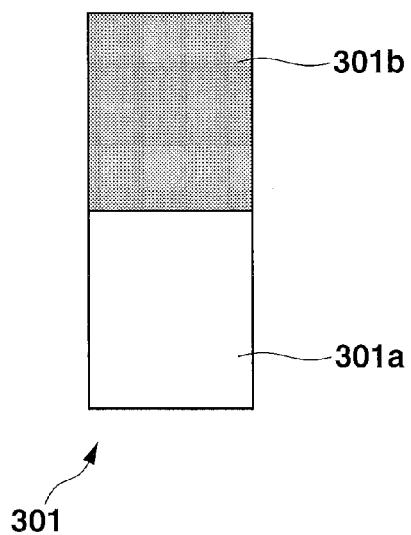
FIG. 5B is a schematic view of chips of a blue light source of the projector according to the first embodiment of the invention as viewed from a light emitting side thereof.

Next, based on FIGS. 5A and 5B, the blue light source device 300 and the blue light source 301 will be described. FIG. 5A is a schematic plan view showing the blue light source device 300 in an enlarged fashion. FIG. 5B is a schematic view showing the blue light source 301 in a more enlarged fashion as viewed from a light emitting side Q of the blue light source 301.

In the blue light source 301 shown in FIGS. 5A and 5B, when looking at the blue light source 301 from the side thereof from which light is emitted, a blue LED chip 301a is disposed on a right hand side and a purple LED chip 301b is disposed on a left hand side. The purple LED chip 301b has a better luminous efficiency than that of the blue LED chip 301a. Blue light of a wavelength of about 460 nm is emitted from the blue LED chip 301a, and purple light of a wavelength of about 445 nm is emitted from the purple LED chip 3011b. Thus, of the blue light and the purple light which are lights of different wavelengths which exist in a range of light wavelengths producing light of similar colors in the range of blue wavelengths (for example, 435 nm to 480 nm), blue light or light of a long wavelength is emitted from the blue LED chip 301a, and purple light or light of a short wavelength is emitted from the purple LED chip 301b, hence the blue LED chip 301a is referred to as a long wavelength light emitting portion and the purple LED chip 301b is referred to as a short wavelength light emitting portion. In this way, the blue light source device 301, which is a second light source, is formed as a multi-chip light source including the two types of light emitting diodes which are semiconductor light emitting elements.

Figure 2:
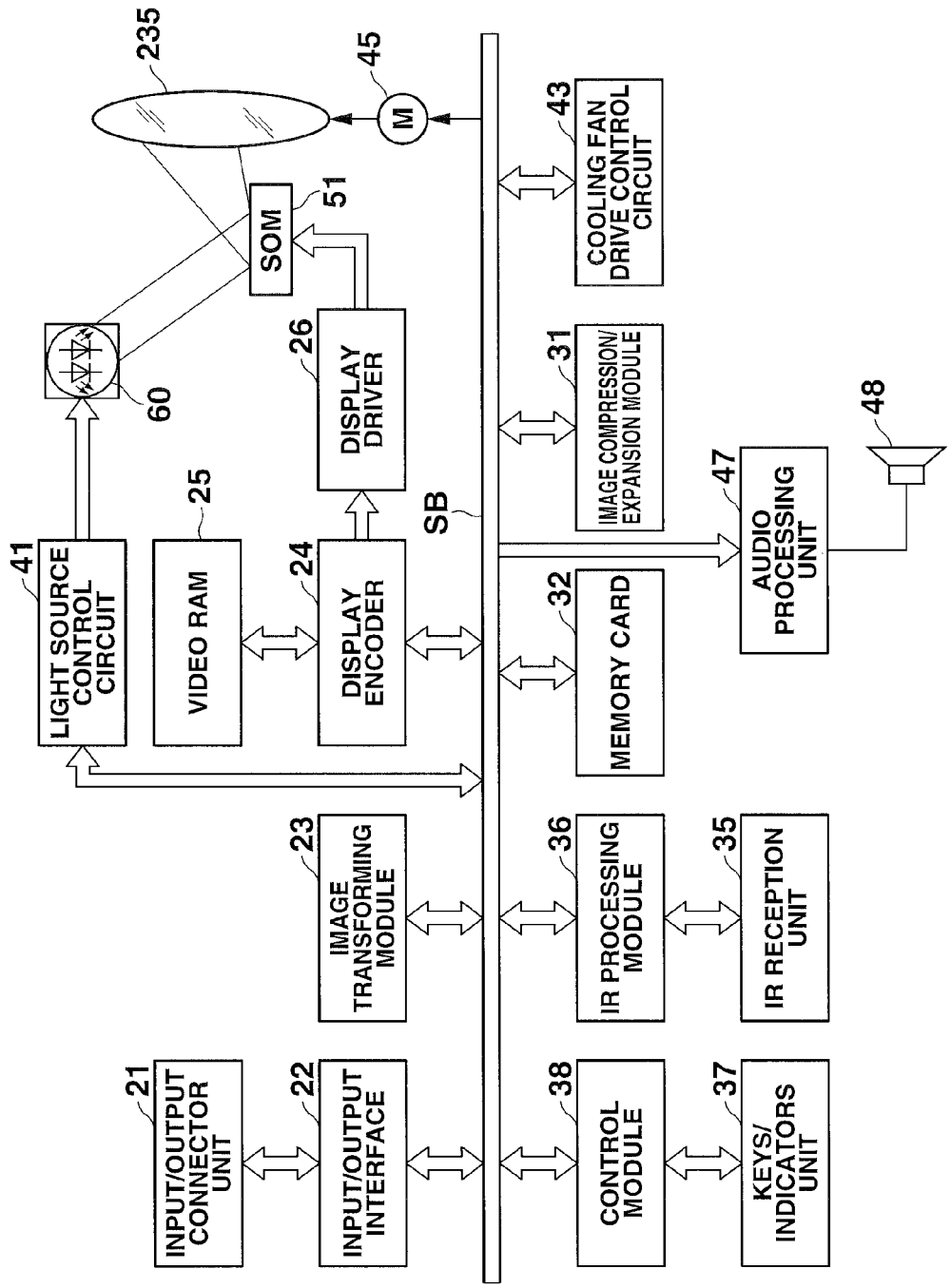
FIG. 2 is a diagram showing functional blocks of the projector according to the first embodiment of the invention.

The light source control circuit 41, which is a light source controller shown in FIG. 2, controls the light source unit 60 based on two modes of a "luminance stressed mode" which is a first mode and a "color stressed mode" which is a second mode. Specifically speaking, for example, in the case of the projector 10 being placed in a bright location, the "luminance stressed mode" is selected automatically by an illuminance sensor or based on a selection made by the user. In the "luminance stressed mode" which is the first mode, being given a command to emit light in the range of red wavelengths from the control module 38, the light source control circuit 41 controls the red light source device 120 (the red light source 121) so as to illuminate simultaneously the red LED chip 121a and the amber LED chip 121b. Similarly, in the "luminance stressed mode," being given a command to emit light in the range of blue wavelengths from the control module 38, the light source control circuit 41 controls the blue light source device 300 (the blue light source 301) so as to illuminate simultaneously the blue LED chip 301a and the purple LED chip 301b.

White light that is produced in this "luminance stressed mode" is produced by mixing blue light from the blue LED chip 301a and red light from the red LED chip 121a and further purple light from the purple LED chip 301b and amber light from the amber LED ship 121b. Consequently, since the light in the range of blue wavelengths and the light in the range of red wavelengths are both drawn towards the short wavelength sides, there is produced white light which looks like more white (that is, which has high illuminance).

In the case of the projector 10 being placed in a dark room to show, for example, a film with the tone of a projected image made clearer although no high illuminance is required, the "color stressed mode" is selected automatically by the illuminance sensor or based on a selection made by the user. In the "color stressed mode" which is the second mode, being given a command to emit light in the range of red wavelengths from the control module 38, the light source control circuit 41 controls the red light source device 120 (the red light source 121) so as to illuminate only the red LED chip 121a with the amber LED chip 121b kept unilluminated. Similarly, being given a command to emit light in the range of blue wavelengths from the control module 38, the light source control circuit 41 controls the blue light source device 300 (the blue light source 301) so as to illuminate only the blue LED chip 301a with the purple LED chip 301b kept unilluminated. In this way, only red light is emitted in the light in the range of red wavelengths, and only blue light is emitted in the light in the range of blue wavelengths, and therefore, it is possible to obtain projected light with an appropriate tone.

Figure 6:
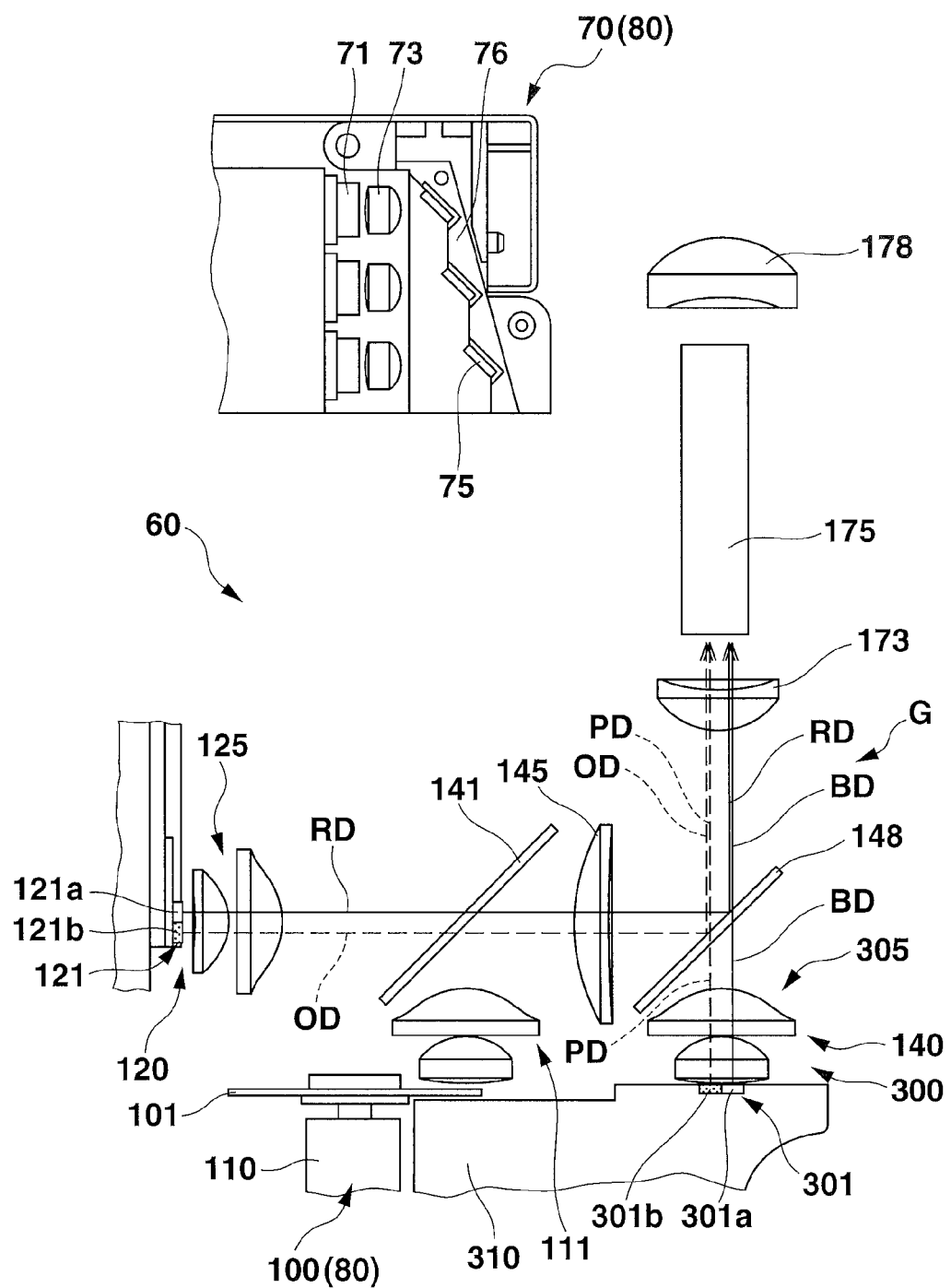
FIG. 6 is a schematic plan view of a light source unit of the invention which is shown in an enlarged fashion.

Here, as shown in FIG. 6, red light RD and amber light OD which both fall in the light in the range of red wavelengths emitted from the red light source device 120 are reflected towards the collective lens 173 and the light tunnel 175 of the light source-side optical system 170 by the second dichroic mirror 148 via the first dichroic mirror 141 and the collective lens 145. On the other hand, blue light BD and purple light PD which both fall in the light in the range of blue wavelengths emitted from the blue light source device 300 pass through the second dichroic mirror 148 to be directed towards the collective lens 173 and the light tunnel 175 of the light source-side optical system 170. In this way, the optical path from the second dichroic mirror 149 onward is referred to as a section G where light in the range of red wavelengths (red light RD and amber light OD) emitted from the red light source device 120 and light in the range of blue wavelengths (blue light BD and purple light PD) emitted from the blue light source device 300 are guided on the same optical path.

As this occurs, due to a relationship between an arrangement of the red LED chip 121a and the amber LED chip 121b of the red light source 121 and an arrangement of the blue LED chip 301a and the purple LED chip 301b of the blue light source 301, in the section G, red light RD and blue light BD are designed to overlap each other, and amber light OD and purple light PD are designed to overlap each other.

As shown in FIGS. 4B and 5B, in the event that a direction which is parallel to a horizontal direction of the projector 10 is referred to as a row direction, the arrangement of the long wavelength light emitting portion (the red LED chip 121a) and the short wavelength light emitting portion (the amber LED chip 121b) of the red light source 121, which is the first light source, in the row direction and the arrangement of the long wavelength light emitting portion (the blue LED chip 301a) and the short wavelength light emitting portion (the purple LED chip 301b) of the blue light source 301, which is the second light source, in the row direction are symmetrical. Due to this configuration, light (red light RD) emitted from the long wavelength light emitting portion (the red LED chip 121a) of the red light source 121, which is the first light source, overlaps light (blue light BD) emitted from the long wavelength light emitting portion (the blue LED chip 301a) of the blue light source 301, which is the second light source, in the section G shown in FIG. 6. Similarly, light (amber light OD) emitted from the short wavelength light emitting portion (the amber LED chip 121b) of the red light source 121, which is the first light source, overlaps light (purple light PD) emitted from the short wavelength light emitting portion (the purple LED chip 301b) of the blue light source 301, which is the second light source, in the section G shown in FIG. 6. Thus, axes of the red light RD and the blue light BD are united and similarly, axes of the amber light OD and the purple light PD are united, whereby the blur of a projected image can be reduced.

In particular, in the "color stressed mode," in the event that only the long wavelength light emitting portions (the red LED chip 121a, the blue LED chip 301a) are illuminated, a deviating direction of light (red light RD) emitted from the red light source 121 becomes substantially the same as a deviating direction of light (blue light BD) emitted from the blue light source 301, whereby a projected image can be obtained whose tone is accurate.

In the event that only the long wavelength light emitting portions (the red LED chip 121a, the blue LED chip 301a) are illuminated in the "color stressed mode," an axis of light emitted from the red LED chip 121a and an axis of light emitted from the blue LED chip 301a overlap each other, and at the same time, the plurality of blue laser diodes 71 are controlled in such a way that only the blue laser diodes 71 that are part of the plurality of blue laser diodes 71 and which are located on one side are illuminated so that the distribution of light shone by the excitation light shining device 70 including the plurality of blue laser diodes 71 is offset to one side. By doing so, the axis of the light emitted from the red LED chip 121a, the axis of the light emitted from the blue LED chip 301a and an axis of a pencil of light which is emitted in a luminescent fashion as a result of the green luminescent material in the green luminescent material layer of the luminescent wheel 101 being excited by excitation light emitted from the blue laser diodes 71 which are located on the one side come to overlap one another, thereby making it possible to reduce the generation of irregularity of color.

In this embodiment, since light in the range of red wavelengths is reflected by the second dichroic mirror 148, the arrangement of the long wavelength light emitting portion (the red LED chip 121a) and the short wavelength light emitting portion (the amber LED chip 121b) of the red light source 121 in the row direction is made to be symmetrical with the arrangement of the long wavelength light emitting portion (the blue LED chip 301a) and the short wavelength light emitting portion (the purple LED chip 301b) of the blue light source 301 in the row direction. However, depending upon the number of times of reflection of light emitted from the first light source and the second light source by the reflecting mirrors, the arrangement of the long wavelength light emitting portion and the short wavelength light emitting portion of the red light source 121 in the row direction can be the same as the arrangement of the long wavelength light emitting portion and the short wavelength light emitting portion of the blue light source in the row direction.

In addition, the excitation light shining device 70, which shines excitation light on to the luminescent wheel 101 of the luminescent plate device 100 can also be controlled by the light source control circuit 41 so that the number of blue laser diodes 71 to be driven in the "luminance stressed mode" and the "color stressed mode" can be changed. Namely, in the "color stressed mode" in which the luminance of light emitted from the red light source device 120 and the blue light source device 300 is reduced, the excitation light shining device 70 may be controlled by the light source control circuit 41 so that a smaller number of blue laser diodes 71 than the number of blue laser diodes 71 driven in the "luminance stressed mode" is driven. By doing so, also in the "color stressed mode," the luminance of light emitted from the red light source device 120 and the blue light source device 300 can be balanced against the luminance of luminous light emitted from the luminescent plate device 100.

Second Embodiment

Figure 7A:
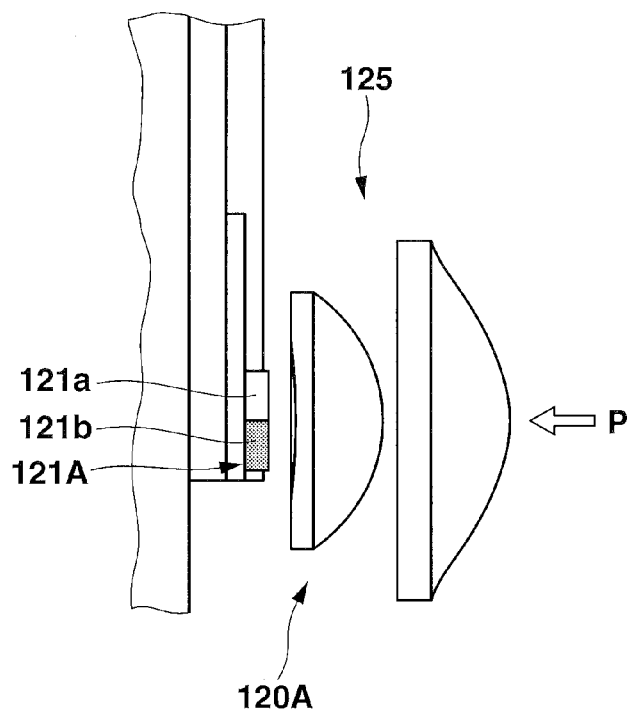
FIG. 7A is an enlarged schematic plan view of a red light source device of a projector according to a second embodiment of the invention.
Figure 7B:
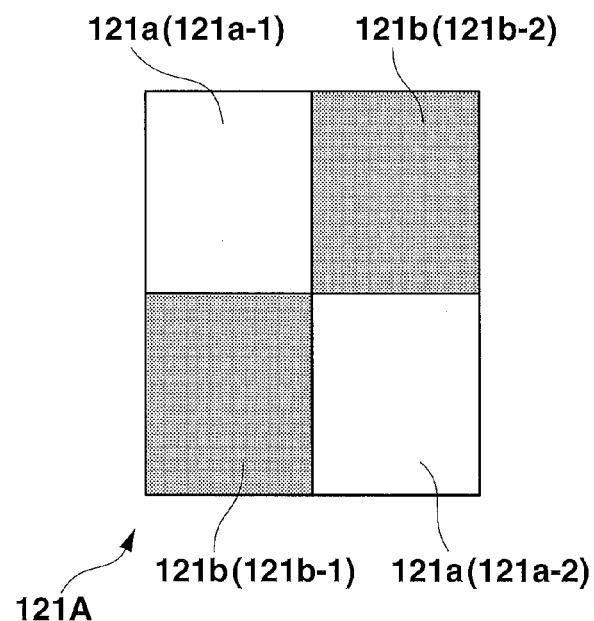
FIG. 7B is a schematic view of chips of a red light source of the projector according to the second embodiment of the invention as viewed from a light emitting side thereof.
Figure 8A:
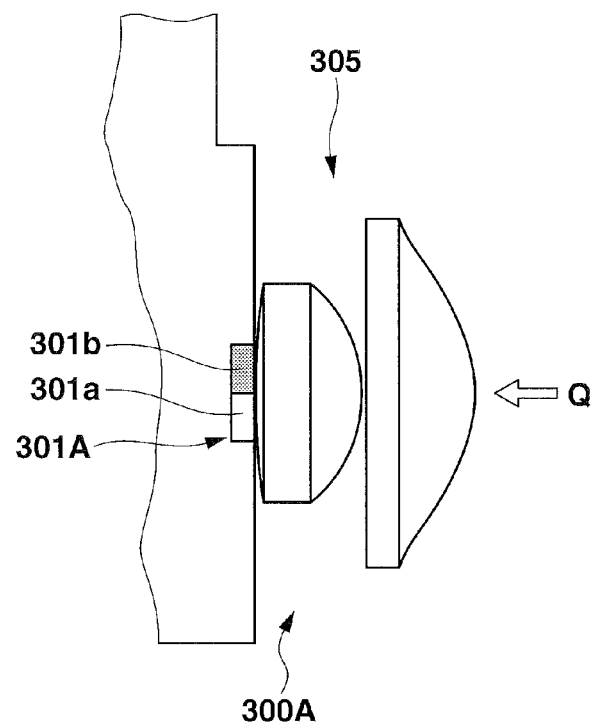
FIG. 8A is an enlarged schematic plan view of a blue light source device of the projector according to the second embodiment of the invention.
Figure 8B:
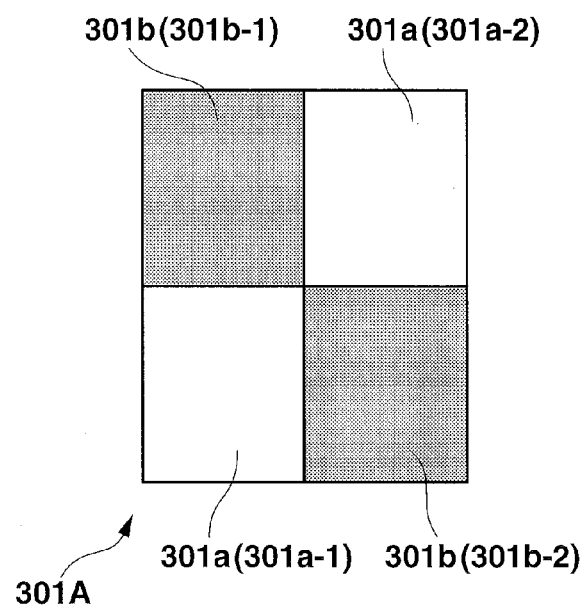
FIG. 8B is a schematic view of chips of a blue light source of the projector according to the second embodiment of the invention as viewed from a light emitting side thereof.

Next, referring to FIGS. 7 and 8, a second embodiment of the invention will be described. In the second embodiment, the numbers of red LED chips 121a and amber LED chips 121b of the red light source 121 of the red light source device 120 and the numbers of blue LED chips 301a and purple LED chips 301b of the blue light source 301 of the blue light source device 300 in the first embodiment are changed to provide a red light source device 120A (a red light source 121A) and a blue light source device 300A (a blue light source 301A). FIG. 7A is a schematic plan view of the red light source device 120A. FIG. 7B is a schematic view of the red light source 121A shown in a more enlarged fashion as viewed from a side P where light is emitted. Similarly, FIG. 8A is a schematic plan view of the blue light source device 300A. FIG. 8B is a schematic view of the blue light source device 300A shown in a more enlarged fashion as viewed from a side Q where light is emitted.

As shown in FIG. 7B, in the red light source 121A, a plurality of long wavelength light emitting portions (red LED chips 121a-1, 121a-2) and a plurality of short wavelength light emitting portions (amber LED chips 121b-1, 121b-2) are disposed. In this embodiment, the long wavelength light emitting portions (the red LED chips 121a-1, 121a-2) and the short wavelength light emitting portions (the amber LED chips 121b-1, 121b-2) are arranged into a matrix configuration in which the long wavelength light emitting portions and the short wavelength light emitting portions are disposed into a plurality of rows and a plurality of columns in an alternating fashion. Specifically speaking, in a column direction, the long wavelength light emitting portions and the short wavelength light emitting portions are disposed into two columns. When referred to herein, the column direction means a vertical direction (in a left-to-right direction in FIG. 7B) of a projector 10.

In an arrangement of the long wavelength light emitting portions (the red LED chips 121a-1, 121a-2) and the short wavelength light emitting portions (the amber LED chips 121b-1, 121b-2), in one column, (an upper column in FIG. 7B), the long wavelength light emitting portion (the red LED chip 121a-1) and the short wavelength light emitting portion (the amber LED chip 121b-2) are disposed adjacent to each other in that order. In the other column (a lower column in FIG. 7B), the short wavelength light emitting portion (the amber LED chip 121b-1) and the long wavelength light emitting portion (the red LED chip 121a-2) are disposed adjacent to each other in that order.

Similarly, in the blue light source device 300A (the blue light source 301A) shown in FIG. 8, long wavelength light emitting portions (blue LED chips 301a-1, 301a-2) and short wavelength light emitting portions (purple LED chips 301b-1, 301b-2) are arranged into a matrix configuration in which the long wavelength light emitting portions and the short wavelength light emitting portions are disposed into a plurality of rows and a plurality of columns in an alternating fashion. Specifically speaking, the long wavelength light emitting portions and the short wavelength light emitting portions are disposed into two columns. More specifically, in one column or a lower column of the blue light source 301A in FIG. 8B, the long wavelength light emitting portion (the blue LED chip 301a-1) and the short wavelength light emitting portion (the purple LED chip 301b-2) are disposed adjacent to each other in that order. In the other column or an upper column in FIG. 8B, the short wavelength light emitting portion (the purple LED chip 301b-1) and the long wavelength light emitting portion (the blue LED chip 301a-2) are disposed adjacent to each other in that order. Then, the arrangement of the long wavelength light emitting portion and the short wavelength light emitting portion of the red light source 121A is symmetrical with the arrangement of the long wavelength light emitting portion and the short wavelength light emitting portion of the blue light source 301A.

In this way, in the red light source 121A and the blue light source 301A, the light emitting elements emitting red light and amber light which have the wavelengths producing light of similar colors and the light emitting elements emitting blue light and purple light which have the wavelengths producing light of similar colors are disposed symmetrical with each other, whereby even in the event that all the light emitting elements of the long wavelength light emitting portions (the red LED chips 121a-1, 121a-2 and the blue LED chips 301a-1, 301a-2) and the short wavelength light emitting portions (the amber LED chips 121b-1, 121b-2 and the purple LED chips 301b-1, 301b-2) are illuminated in the "luminance stressed mode," there is no situation where light emitted from the long wavelength light emitting portions and the short wavelength light emitting portions is concentrated, thereby making it possible to reduce the generation of irregularity of color.

Further, an arrangement of the long wavelength light emitting portion and the short wavelength light emitting portion of the red light source 121A in a row direction and an arrangement of the long wavelength light emitting portion and the short wavelength light emitting portion of the blue light source 301A in a row direction are symmetrical with each other, whereby light emitted from the long wavelength light emitting portions of the red light source device 120A and light emitted from the long wavelength light emitting portions of the blue light source device 300A are united so as to overlap each other and light emitted from the short wavelength light emitting portions of the red light source device 120A and light emitted from the short wavelength light emitting portions of the blue light source device 300A are united so as to overlap each other in a section G (refer to FIG. 6) where light emitted from the red light source device 120A and light emitted from the blue light source device 300A are guided on the same optical path. Consequently, the blur of a projected image can be reduced.

Third Embodiment

Figure 9A:
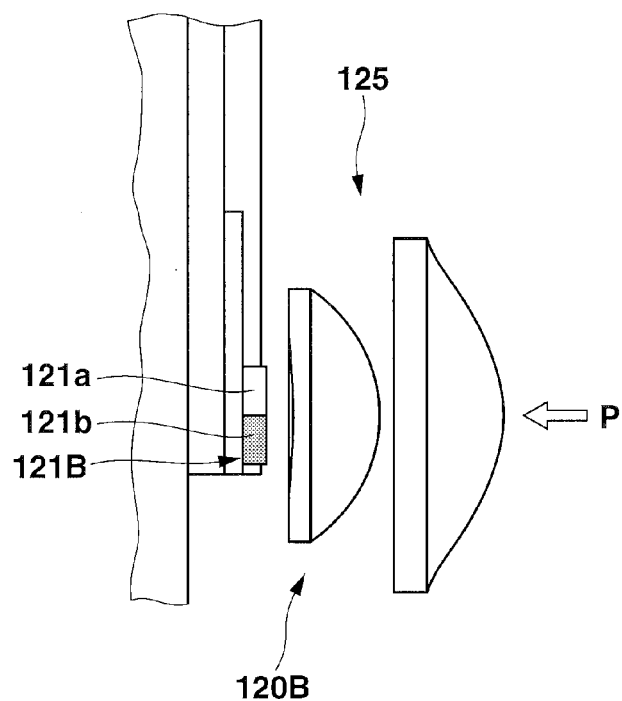
FIG. 9A is an enlarged schematic plan view of a red light source device of a projector according to a third embodiment of the invention.
Figure 9B:
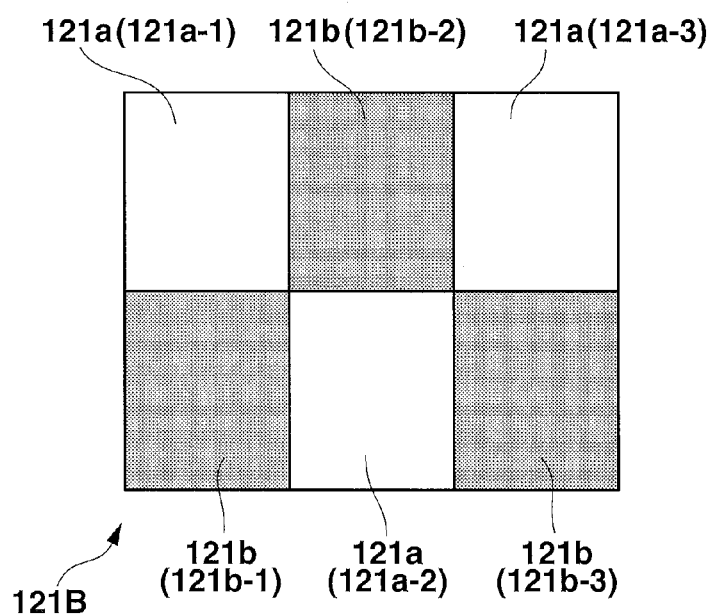
FIG. 9B is a schematic view of chips of a red light source of the projector according to the third embodiment of the invention as viewed from a light emitting side thereof.
Figure 10A:
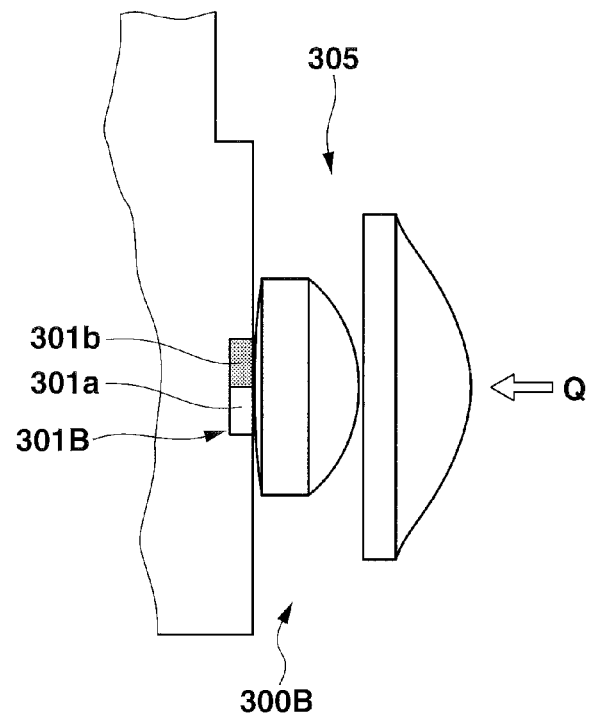
FIG. 10A is an enlarged schematic plan view of a blue light source device of the projector according to the third embodiment of the invention.
Figure 10B:
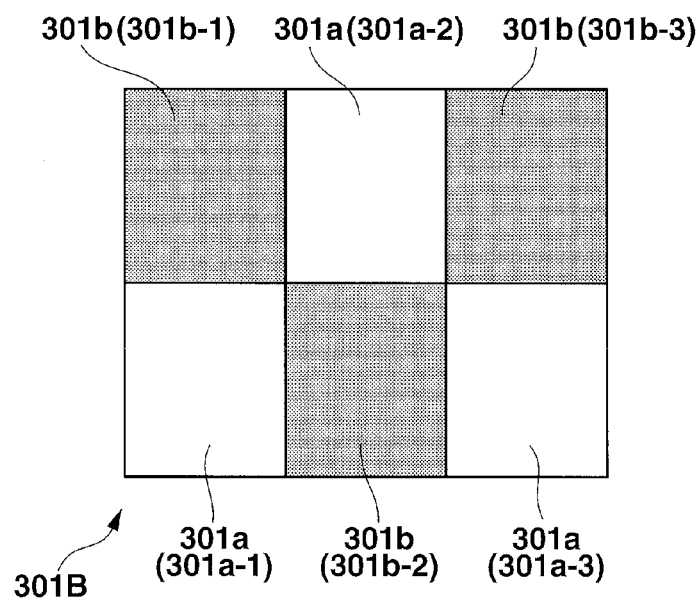
FIG. 10B is a schematic view of chips of a blue light source of the projector according to the third embodiment of the invention as viewed from a light emitting side thereof.

Next, referring to FIGS. 9 and 10, a third embodiment of the invention will be described. In the third embodiment, the numbers of red LED chips 121a and amber LED chips 121b of the red light source 121 of the red light source 120 and the numbers of blue LED chips 301a and purple LED chips 301b of the blue light source 301 of the blue light source device 300 in the first embodiment are changed to provide a red light source device 120B (a red light source 121B) and a blue light source device 300B (a blue light source 301B). FIG. 9A is a schematic plan view of the red light source device 120B. FIG. 9B is a schematic view of the red light source 121B shown in a more enlarged fashion as viewed from a side P where light is emitted. Similarly, FIG. 10A is a schematic plan view of the blue light source device 300B. FIG. 10B is a schematic view of the blue light source device 300B shown in a more enlarged fashion as viewed from a side Q where light is emitted.

As shown in FIG. 9B, in this embodiment, long wavelength light emitting portions (red LED chips 121a-1, 121a-2, 121a-3) and short wavelength light emitting portions (amber LED chips 121b-1, 121b-2, 121b-3) are arranged into a matrix configuration in which the long wavelength light emitting portions and the short wavelength light emitting portions are disposed into a plurality of rows and a plurality of columns in an alternating fashion. Specifically speaking, the long wavelength light emitting portions and the short wavelength light emitting portions are disposed into two columns. Then, in one column (an upper column in FIG. 9B), the long wavelength light emitting portion (the red LED chip 121a-1), the short wavelength light emitting portion (the amber LED chip 121b-2) and the long wavelength light emitting portion (the red LED chip 121a-3) are disposed alternately so as to be aligned sequentially in that order. In the other column (a lower column in FIG. 9B), the short wavelength light emitting portion (the amber LED chip 121b-1), the long wavelength light emitting portion (the red LED chip 121a-2) and the short wavelength light emitting portion (the amber LED chip 121b-3) are disposed alternately so as to be aligned sequentially in that order.

Similarly, in the blue light source device 300B (the blue light source 301B) shown in FIG. 10, long wavelength light emitting portions (blue LED chips 301a-1, 301a-2, 301a-3) and short wavelength light emitting portions (purple LED chips 301b-1, 301b-2, 301b-3) are arranged into a matrix configuration in which the long wavelength light emitting portions and the short wavelength light emitting portions are disposed into a plurality of rows and a plurality of columns in an alternating fashion. Specifically speaking, the long wavelength light emitting portions and the short wavelength light emitting portions are disposed into two columns. Then, in one column or a lower column of the blue light source 301B in FIG. 10B, the long wavelength light emitting portion (the blue LED chip 301*a*-1), the short wavelength light emitting portion (the purple LED chip 301*b*-2) and the long wavelength light emitting portion (the blue LED chip 301*a*-3 are disposed alternately so as to be aligned sequentially in that order. In the other column or an upper column in FIG. 10B, the short wavelength light emitting portion (the purple LED chip 301*b*-1), the long wavelength light emitting portion (the blue LED chip 301*a*-2) and the short wavelength light emitting portion (the purple LED chip 301*b*-3) are disposed alternately so as to be aligned sequentially in that order. Thus, an arrangement of the long wavelength light emitting portion and the short wavelength light emitting portion of the red light source 121B in a row direction is symmetrical with an arrangement of the long wavelength light emitting portion and the short wavelength light emitting portion of the blue light source 301B.

In this way, in this embodiment, too, in the red light source 121B and the blue light source 301B, the light emitting elements emitting red light and amber light which have the wavelengths producing light of similar colors and the light emitting elements emitting blue light and purple light which have the wavelengths producing light of similar colors are disposed symmetrical with each other, whereby even in the event that all the light emitting elements of the long wavelength light emitting portions (the red LED chips 121*a*-1, 121*a*-2, 121*a*-3 and the blue LED chips 301*a*-1, 301*a*-2, 301*a*-3) and the short wavelength light emitting portions (the amber LED chips 121*b*-1, 121*b*-2, 121*b*-3 and the purple LED chips 301*b*-1, 301*b*-2, 301*b*-3) are illuminated in the "luminance stressed mode," there is no situation where light emitted from the long wavelength light emitting portions and the short wavelength light emitting portions is concentrated, thereby making it possible to reduce the generation of irregularity of color.

Further, the arrangement of the long wavelength light emitting portion and the short wavelength light emitting portion of the red light source 121B in the row direction and the arrangement of the long wavelength light emitting portion and the short wavelength light emitting portion of the blue light source 301B in the row direction are symmetrical with each other, whereby light emitted from the long wavelength light emitting portions of the red light source device 120B and light emitted from the long wavelength light emitting portions of the blue light source device 300B are united so as to overlap each other and light emitted from the short wavelength light emitting portions of the red light source device 120B and light emitted from the short wavelength light emitting portions of the blue light source device 300B are united so as to overlap each other in a section G (refer to FIG. 6) where light emitted from the red light source device 120B and light emitted from the blue light source device 300B are guided on the same optical path. Consequently, the blur of a projected image can be reduced.

Thus, while the embodiments of the invention have been described heretofore, the invention is not limited to those embodiments, and hence the invention can be carried out while making various alterations or modifications. For example, while the red light source 121 (121A, 121B) and the blue light source 301 (301A, 301B) are made up of the light emitting diodes, other semiconductor light emitting elements such as laser diodes or other light emitting elements can also be used.

In addition, in the embodiments, the row direction in the red light source 121 (121A, 121B) and the blue light source 301 (301A, 301B) is referred to as the horizontal direction of the projector 10, and the column direction is referred to as the vertical direction of the projector 10. However, the invention is not limited thereto, and hence, the row direction and the column direction can be set arbitrarily. Thus, the row direction can be referred to as the vertical direction of the projector 10, while the column direction can be referred to as the horizontal direction of the projector 10.

Thus, according to the embodiments of the invention, the light source unit 60 includes the red light source 121 (121A, 121B) which is the first light source and the blue light source 301 (301A, 301B) which is the second light source. Light in the range of red wavelengths is emitted from the red light source 121 (121A, 121B) as light in the range of first wavelengths. Light in the range of blue wavelengths is emitted from the blue light source 301 (301A, 301B) as light in the range of second wavelengths. Then, the red light source 121 (121A, 121B) includes the red LED chip 121*a* or the long wavelength light emitting portion which emits, of the lights of different wavelengths which exist in the range of light wavelengths producing light of similar colors, red light which is light of a long wavelength, and the amber LED chip 121*b* or the short wavelength light emitting portion which emits amber light which is light of a short wavelength. Similarly, the blue light source 301 (301A, 301B) includes the blue LED chip 301*a* or the long wavelength light emitting portion which emits, of the lights of different wavelengths which exist in the range of light wavelengths producing light of similar colors, blue light which is light of a long wavelength, and the purple LED chip 301*b* or the short wavelength light emitting portion which emits purple light which is light of a short wavelength.

By adopting this configuration, the red light source device 120 (120A, 120B) and the blue light source device 300 (300A, 300B) can each emit the lights of different wavelengths which exist in the range of wavelengths producing light of similar colors, and therefore, in producing white light, the luminance of white light produced can be enhanced. Additionally, the red light source device 120 (120A, 120B) and the blue light source device 300 (300A, 300B) each include the two types of LED chips, and therefore, the light source unit 60 can be formed compact in size. Namely, the amber LED chip 121*b* has the better luminance efficiency than that of the red LED chip 121*a*. Owing to this, providing the red LED chip 121*a* and the amber LED chip 121*b* in parallel in the red light source 121 can enhance the luminance of light emitted therefrom more than providing simply two red LED chips 121*a* in the red light source 121. Similarly, the purple LED chip 301*b* has the better luminance efficiency than that of the blue LED chip 301*a*. Owing to this, providing the blue LED chip 301*a* and the purple LED chip 301*b* in parallel in the blue light source 301 can enhance the luminance of light emitted therefrom more than providing simply two blue LED chips 301*a* in the blue light source 301.

In the red light source 121A (121B) which is the first light source, the long wavelength light emitting portions (the red LED chips 121*a*-1, 121*a*-2 (121*a*-1, 121*a*-2, 121*a*-3)) and the short wavelength light emitting portions (the amber LED chips 121*b*-1, 121*b*-2 (121*b*-1, 121*b*-2, 121*b*-3)) are disposed alternately into the matrix configuration in which the long wavelength light emitting portions and the short wavelength light emitting portions are arranged in rows and columns. Similarly, in the blue light source 301A (301B) which is the second light source, the long wavelength light emitting portions (the blue LED chips 301*a*-1, 301*a*-2 (301*a*-1, 301*a*-2, 301*a*-3)) and the short wavelength light emitting portions (the purple LED chips 301*b*-1, 301*b*-2 (301*b*-1, 301*b*-2, 301*b*-3)) are disposed alternately into the matrix configuration in which the long wavelength light emitting portions and the short wavelength light emitting portions are arranged in rows and columns.

By adopting this configuration, in the first light source and the second light source, the long wavelength light emitting portions can be arranged symmetrical with the short wavelength light emitting portions. Consequently, even in the event that both the long wavelength light emitting portions and the short wavelength light emitting portions are illuminated, light can be emitted which is free from an uneven color distribution, thereby making it possible to obtain the light source unit 60 which can reduce the irregularity of color in projected light.

In the red light source 121 (121A, 121B) which is the first light source and the blue light source 301 (301A, 301B) which is the second light source, the long wavelength light emitting portion (the red LED chip 121*a*) and the short wavelength light emitting portion (the amber LED chip 121*b*), and the long wavelength light emitting portion (the blue LED chip 301*a*) and the short wavelength light emitting portion (the purple LED chip 301*b*) are arranged so that light emitted from the long wavelength light emitting portion of the first light source and light emitted from the long wavelength light emitting portion of the second light source overlap each other in the section G and that light emitted from the short wavelength light emitting portion of the first light source and light emitted from the short wavelength light emitting portion of the second light source overlap each other in the section G. By adopting this configuration, the light source unit 60 can be provided which can reduce the blur of a projected image.

In the first embodiment, one red LED chip 121*a* is provided in the red light source 121, and one blue LED chip 301*a* is provided in the blue light source 301. In the second embodiment, two red LED chips 121*a* are provided in the red light source 121A, and two blue LED chips 301*a* are provided in the blue light source 301A. In the third embodiment, three red LED chips 121*a* are provided in the red light source 121B, and three blue LED chips 301*a* are provided in the blue light source 301B.

In these embodiments, the red light sources 121, 121A, 121B are formed so as to have the different numbers of red LED chips 121*a*, and the blue light sources 301, 301A, 301B are formed so as to have the different numbers of blue LED chips 301*a*. Thus, the number of blue laser diodes 71 may be increased or decreased according to the numbers of red LED chips 121*a* and blue LED chips 301*a*. By doing so, the axis of light emitted from the red LED chip 121*a*, the axis of light emitted from the blue LED chip 301*a* and the axis of a pencil of luminous light which is emitted in a luminescent fashion by the green luminescent material in the green luminescent material layer of the luminescent wheel 101 which is excited by excitation light shone on thereto from the blue laser diodes 71 are allowed to overlap one another. This reduces the irregularity of color, whereby the quality of a projected image can be improved.

The arrangement of the long wavelength light emitting portions (the red LED chips 121*a*) and the short wavelength light emitting portions (the amber LED chips 121*b*) in the row direction of the red light source 121 (121A, 121B) which is the first light source and the arrangement of the long wavelength light emitting portions (the blue LED chips 301*a*) and the short wavelength light emitting portions (the purple LED chips 301*b*) in the row of the blue light source 301 (301A, 301B) are symmetrical with each other. By adopting this configuration, even in the event that an optical path is set in which one of light emitted from the first light source and light emitted from the second light source is reflected at an angle of 90 degrees by the mirror, light emitted from the long wavelength light emitting portion of the first light source and light emitted from the long wavelength light emitting portion of the second light source can be made to overlap each other in the section G and light emitted from the short wavelength light emitting portion of the first light source and light emitted from the short wavelength light emitting portion of the second light source can be made to overlap each other in the section G.

The light source control circuit 41, which is the light source controller, has the first mode (the luminance stressed mode) in which the long wavelength light emitting portions (the red LED chips 121*a*, the blue LED chips 301*a*) and the short wavelength light emitting portions (the amber LED chips 121*b*, the purple LED chips 301*b*) of the first light source (the red light source 121 (121A, 121B)) and the second light source 301 (301A, 301B) are all illuminated and the second mode (the color stressed mode) in which only the long wavelength light emitting portions of the first light source and the second light source are illuminated. By adopting this configuration, the light source unit 60 can be provided which can emit highly bright light source light and light source light in which the tone of red, green and blue light is stressed.

The first light source is the red light source 121 (121A, 121B) which includes the red LED chip 121*a* and the amber LED chip 121*b* which are semiconductor light emitting elements, and the second light source is the blue light source 301 (301A, 301B) which includes the blue LED chip 301*a* and the purple LED chip 301*b* which are semiconductor light emitting elements. By adopting this configuration, the light source unit 60 can be obtained which operates while saving electric power.

The led light source device 120 (120A, 120B) which emits light in the range of red wavelengths which is light in the range of first wavelengths has the red light source 121 (121A, 121B) which is made up of the red LED chip 121*a* which emits red light and the amber LED chip 121*b* which emits amber light. On the other hand, the blue light source device 300 which emits light in the range of blue wavelengths which is light in the range of second wavelengths has the blue LED chip 301*a* which emits blue light and the purple LED chip 301*b* which emits purple light. By adopting this configuration, red light can be emitted from the red light source together with amber light which is light whose wavelength is shorter than that of red light, and blue light can be emitted from the blue light source together with purple light which is light whose wavelength is shorter than that of blue light.

The light source unit 60 has the excitation light shining device 70 which acts as the excitation light source and the luminescent plate device 100 including the luminescent wheel which is the luminescent plate. Then, when excitation light is shone on to the luminescent wheel 101, luminescent light in the range of green wavelengths is emitted from the luminescent wheel 101. White light produced by this luminous light in the range of green wavelengths and light in the range of red wavelengths emitted from the red light source device 120 and light in the range of blue wavelengths emitted from the blue light source device 300 can be made into white light which is more white by the ambler LED chip 121*b* of the red light source 121 (121A, 121B) and the purple LED chip 301*b* of the blue light source 301 (301A, 301B). Thus, it is possible to obtain highly bright light.

Then, the light source control circuit 41, which is the light source controller, controls the excitation light source according to the luminance of light emitted from the first light source (the red light source 121 (121A, 121B)) and the luminance of light emitted from the second light source (the blue light source 301 (301A, 301B)). By adopting this configuration, the luminance of light emitted from the luminescent plate device 100 can be controlled according to the luminance of light emitted from the red light source 121 (121A, 121B) and the blue light source 301 (301A, 301B), and therefore, it is possible to obtain light source light with an appropriate luminance balance.

The projector 10 includes the light source unit 60, the display device 51, the projection-side optical system 220 and the projector controller. By adopting this configuration, it is possible to provide the projector 10 including the light source unit 60 which can be formed compact in size while enhancing the luminance of white light.

The embodiments that have been described heretofore are presented as the examples, and there is no intention at all to limit the scope of the invention by those embodiments. These novel embodiments can be carried out in other various forms, and hence, various omissions, replacements, alterations and modifications can be made thereto. These embodiments and their modifications are included in the spirit and scope of the invention and are included in the scope of inventions claimed under claims and their equivalents.

What is claimed is:

1. A light source unit comprising:
a first light source which emits light in a range of first wavelengths and comprises a long wavelength light emitting portion and a short wavelength light emitting portion, the long wavelength light emitting portion emitting light of a long wavelength side in a range of wavelengths producing light of similar colors, and the short wavelength light emitting portion emitting light of a short wavelength side in the range of wavelengths producing light of similar colors;
a second light source which emits light in a range of second wavelengths which is different from the range of first wavelengths and comprises a long wavelength light emitting portion and a short wavelength light emitting portion, the long wavelength light emitting portion emitting light of a long wavelength side in a range of wavelengths producing light of similar colors, and the short wavelength light emitting portion emitting light of a short wavelength side in the range of wavelengths producing light of similar colors; and
a light source controller having a plurality of modes, one of the plurality of modes being a mode for causing only respective long wavelength light emitting portions of the first light source and the second light source to be illuminated.

2. The light source unit according to claim 1,
wherein the first light source and the second light source each comprise a plurality of long wavelength light emitting portions like the long wavelength light emitting portion and a plurality of short wavelength light emitting portions like the short wavelength light emitting portion which are disposed alternately into a matrix configuration in which the long wavelength light emitting portions and the short wavelength light emitting portions are arranged into a plurality of rows and a plurality of columns.

3. The light source unit according to claim 1,
wherein the long wavelength light emitting portion and the short wavelength light emitting portion of the first light source and the long wavelength light emitting portion and the short wavelength light emitting portion of the second light source are arranged so that light emitted from the long wavelength light emitting portion of the first light source and light emitted from the long wavelength light emitting portion of the second light source are disposed at positions where they correspond to each other and that light emitted from the short wavelength light emitting portions of the first light source and light emitted from the short wavelength emitting portion of the second light source are disposed at positions where they correspond to each other.

4. The light source unit according to claim 1,
wherein an arrangement of the long wavelength light emitting portion and the short wavelength light emitting portion in a row direction of the first light source and an arrangement of the long wavelength light emitting portion and the short wavelength light emitting portion in a row direction in the second light source are symmetrical with each other.

5. The light source according to claim 1,
wherein the light source controller has further a mode in which the long wavelength light emitting portion and the short wavelength light emitting portion of the first light source and the long wavelength light emitting portion and the short wavelength light emitting portion of the second light source are illuminated altogether.

6. The light source according to claim 1,
wherein a light source of the first light source and a light source of the second light source are made up of a semiconductor light emitting element.

7. The light source unit according to claim 1,
wherein light in the range of first wavelengths of the first light source is light in a range of red wavelengths, and light emitted from the long wavelength light emitting portion and light emitted from the short wavelength light emitting portion of the first light source are red light and amber light, respectively, and
wherein light in the range of second wavelengths of the second light source is light in a range of blue wavelengths, and light emitted from the long wavelength light emitting portion and light emitted from the short wavelength light emitting portion of the second light source are blue light and purple light, respectively.

8. The light source unit according to claim 1, comprising:
an excitation light source; and
a luminescent plate device comprising a luminescent plate which emits luminous light in a range of green wavelengths as a result of excitation light being shone on to the luminescent plate from the excitation light source.

9. The light source unit according to claim 8,
wherein the excitation light source includes a plurality of blue laser diodes,
wherein the plurality of blue laser diodes are disposed so that when a projection is carried out in a second mode in which only the long wavelength light emitting portions of the first light source and the second light source are illuminated, an axis of light emitted from the long wavelength light emitting portion of the first light source, an axis of light emitted from the long wavelength light emitting portion of the second light source and an axis of a pencil of luminous light emitted in a luminescent fashion from the luminescent plate as a result of a green luminescent material in the luminescent plate being excited by excitation light shone from the plurality of blue laser diodes overlap one another.

10. The light source unit according to claim 8,
wherein the excitation light source includes a plurality of blue laser diodes, and
wherein the number of blue laser diodes is increased or decreased according to the numbers of long wavelength light emitting portions of the first light source and the second light source.

11. The light source unit according to claim 9,
wherein the excitation light source includes a plurality of blue laser diodes, and
wherein the number of blue laser diodes is increased or decreased according to the numbers of long wavelength light emitting portions of the first light source and the second light source.

12. The light source unit according to claim 8,
wherein the excitation light source includes a plurality of blue laser diodes, and
wherein when a projection is carried out in a second mode in which only the long wavelength light emitting portions of the first light source and the second light source are illuminated, the light source controller controls the plurality of blue laser diodes in such a way that some blue laser diodes of the plurality of blue laser diodes are illuminated so that an axis of light emitted from the long wavelength light emitting portion of the first light source, an axis of light emitted from the long wavelength light emitting portion of the second light source and an axis of a pencil of luminous light emitted in a luminescent fashion from the luminescent plate as a result of a green luminescent material in the luminescent plate being excited by excitation light shone from the plurality of blue laser diodes overlap one another.

13. The light source unit according to claim 8,
wherein the excitation light source is driven according to the luminance of the first light source and the second light source.

14. A projector comprising:
the light source unit according to claim 1;
a display device on to which light source light from the light source unit is shone to thereby form image light;
a projection-side optical system which projects the image light emitted from the display device on to a screen; and
a projector controller which controls the display device and the light source unit.

* * * * *